(12) United States Patent
Inoh et al.

(10) Patent No.: US 10,982,810 B2
(45) Date of Patent: Apr. 20, 2021

(54) HIGH-PRESSURE TANK

(71) Applicant: TOYOTA JIDOSHA KABUSHIKI KAISHA, Toyota (JP)

(72) Inventors: Takashi Inoh, Toyota (JP); Hirokazu Otsubo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 15/825,384

(22) Filed: Nov. 29, 2017

(65) Prior Publication Data
US 2018/0163925 A1 Jun. 14, 2018

(30) Foreign Application Priority Data
Dec. 8, 2016 (JP) .............................. JP2016-238100

(51) Int. Cl.
F17C 1/02 (2006.01)
F17C 1/06 (2006.01)
F17C 1/16 (2006.01)
B32B 1/02 (2006.01)

(52) U.S. Cl.
CPC .................. *F17C 1/02* (2013.01); *B32B 1/02* (2013.01); *F17C 1/06* (2013.01); *F17C 1/16* (2013.01); *F17C 2201/0109* (2013.01); *F17C 2201/056* (2013.01); *F17C 2203/0604* (2013.01); *F17C 2203/066* (2013.01); *F17C 2203/0621* (2013.01); *F17C 2203/0636* (2013.01); *F17C 2203/0663* (2013.01); *F17C 2205/0397* (2013.01); *F17C 2221/012* (2013.01); *F17C 2223/0123* (2013.01); *F17C 2223/036* (2013.01); *F17C 2270/0168* (2013.01); *F17C 2270/0184* (2013.01)

(58) Field of Classification Search
CPC ...... F17C 2203/0604; F17C 2203/0619; F17C 2230/0612
USPC ......................................................... 206/586
See application file for complete search history.

(56) References Cited

U.S. PATENT DOCUMENTS

| 5,462,191 | A | * | 10/1995 | Bartlow | ............... | B65D 90/028 220/62.11 |
| 2003/0144391 | A1 | * | 7/2003 | Pollak | ................... | C09D 133/08 524/99 |
| 2011/0303662 | A1 | * | 12/2011 | Handa | .............. | B60K 15/03006 220/62.11 |
| 2013/0087567 | A1 | * | 4/2013 | Kaneko | ..................... | F17C 1/06 220/590 |
| 2014/0166670 | A1 | | 6/2014 | Sirosh | | |

(Continued)

FOREIGN PATENT DOCUMENTS

| EP | 1 571 389 B1 | 4/2010 |
| JP | 10-292899 A | 11/1998 |
| JP | 2008-286297 A | 11/2008 |

(Continued)

*Primary Examiner* — Anthony D Stashick
*Assistant Examiner* — Raven Collins
(74) *Attorney, Agent, or Firm* — Finnegan, Henderson, Farabow, Garrett & Dunner, LLP

(57) ABSTRACT

A high-pressure tank includes a liner, a release agent layer disposed on a surface of the liner, and a reinforcing layer disposed on the release agent layer. The reinforcing layer includes a resin and a fiber. The thickness of the release agent layer is equal to or smaller than the diameter of the fiber of the reinforcing layer.

5 Claims, 3 Drawing Sheets

(56) References Cited

U.S. PATENT DOCUMENTS

2015/0014332 A1* 1/2015 Nishibu .................... F17C 1/02
                                                              220/586
2016/0091140 A1* 3/2016 Takagi ...................... F17C 1/00
                                                              220/590

FOREIGN PATENT DOCUMENTS

| JP | 2015-17641 | 1/2015 |
| JP | 2016-176599 | 10/2016 |

* cited by examiner

<REFERENCE VIEW>

HIGH-PRESSURE TANK

INCORPORATION BY REFERENCE

The disclosure of Japanese Patent Application No. 2016-238100 filed on Dec. 8, 2016 including the specification, drawings and abstract is incorporated herein by reference in its entirety.

BACKGROUND

1. Technical Field

The present disclosure relates to a high-pressure tank.

2. Description of Related Art

As a high-pressure tank, for example, a high-pressure tank having a structure where a release agent layer is disposed between a liner and a reinforcing layer is known, for example as described in Japanese Unexamined Patent Application Publication No. 2016-176599 (JP 2016-176599 A).

SUMMARY

There is a case where a resin that is included in a reinforcing layer and a release agent may be mixed together due to the thickness of a release agent layer. Then, there is a possibility that the releasability of the liner with respect to the reinforcing layer may be lower than usual, and thus the liner and the reinforcing layer may be stuck together, and the expansion and contraction of the liner accompanying a temperature change or the like may be hindered. For that reason, a technique capable of suppressing the sticking between the liner and the reinforcing layer has been desired.

The present disclosure can be realized as the following aspects.

An aspect of the present disclosure relates to a high-pressure tank including a liner; a release agent layer disposed on a surface of the liner, and a reinforcing layer disposed on the release agent layer. The reinforcing layer includes a resin and a fiber. The thickness of the release agent layer is equal to or smaller than the diameter of the fiber of the reinforcing layer. According to the aspect of the present disclosure, since the thickness of the release agent layer is smaller than the diameter of the fiber of the reinforcing layer, a situation in which the resin of the reinforcing layer and the release agent of the release agent layer are mixed together can be suppressed. For that reason, the sticking between the liner and the reinforcing layer can be suppressed.

In the high-pressure tank according to the aspect of the present disclosure, the fiber may be a glass fiber or a carbon fiber.

In the high-pressure tank according to the aspect of the present disclosure, the thickness of the release agent layer may be 1 μm to 6 μm, and the thickness of the reinforcing layer may be 20 mm to 30 mm.

In addition, the present disclosure can be realized in various forms, for example, can be realized in forms, such as a method for manufacturing the high-pressure tank.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
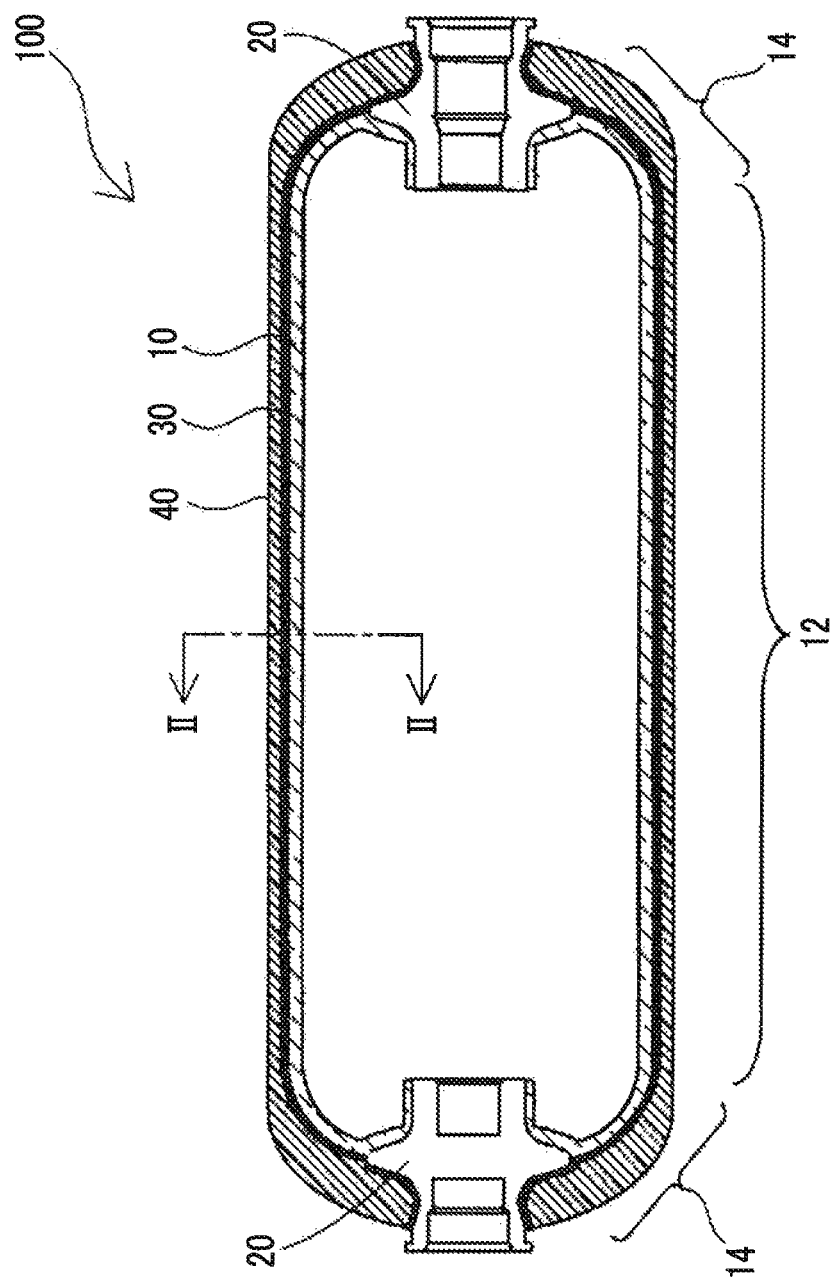
FIG. 1 is a schematic view illustrating a schematic structure of a high-pressure tank.

FIG. 1 is a sectional view illustrating a schematic structure of a high-pressure tank 100 in one embodiment of the present disclosure. The high-pressure tank 100 accommodates high-pressure hydrogen of, for example, 10 MPa to 70 MPa, and is installed in a fuel cell vehicle. The high-pressure tank 100 includes a liner 10, a mouthpiece 20, a release agent layer 30, and a reinforcing layer 40.

The liner 10 has a cylindrical part 12 and two dome parts 14 provided at both ends of the cylindrical part 12. The liner 10 includes, for example, resin, having gas barrier properties against hydrogen gas, such as polyethylene, nylon, polypropylene, or polyester. In addition, in the present embodiment, the liner 10 is made of resin, but the liner 10 may be made of metal. The reinforcing layer 40 is disposed at outer peripheries of the cylindrical part 12 and the dome parts 14. In the present embodiment, mouthpieces 20 are respectively provided at both ends of the liner 10 in a longitudinal direction, but a mouthpiece 20 may be provided solely at one end.

The reinforcing layer 40 is formed, for example, by bundling about 10000 glass fibers or carbon fibers to 40000 glass fibers or carbon fibers (hereinafter simply referred to as "fibers") and impregnating the fibers with thermosetting resin, such as epoxy, thereby forming a fiber bundle, winding the formed fiber bundle on the release agent layer 30 (to be described below) at the outer periphery of the liner 10, through a filament winding method, and thermally curing the wound fiber bundle. As the resin to be impregnated into the fiber bundle, for example, other thermosetting resin, such as unsaturated polyester resin, may be used. In the present embodiment, the diameter of one fiber CF of the reinforcing layer 40 is about 6 μm. The diameter of the fiber CF may be larger than or smaller than 6 μm. In addition, a protective layer for improving the strength of the high-pressure tank 100 may be disposed on an outer surface of the reinforcing layer 40. The protective layer may include, for example, fibrous glass reinforced plastic.

The release agent layer 30 is formed by applying a release agent to the surface of the liner 10 by spraying or wiping and drying the release agent. The application amount per unit area (the weight per unit area) of the release agent is determined in advance such that the thickness (hereinafter referred to as "film thickness") of the release agent layer 30 becomes a predetermined thickness. In the present embodiment, the release agent layer 30 is disposed in the entire region between the liner 10 and the reinforcing layer 40. The release agent layer 30 suppresses sticking between the liner 10 and the reinforcing layer 40.

In the present embodiment, polyethylene wax that is a water-soluble wax-based release agent is used as the release agent. In addition, a silicon-based release agent, a fluorine-based release agent, or the like may be used as the release agent. In addition, the release agent layer 30 may be disposed solely in a region between the cylindrical part 12 and the reinforcing layer 40 in a region between the liner 10 and the reinforcing layer 40. The release agent layer 30 may also be referred to a "sticking preventive layer".

In the present embodiment, the film thickness of the release agent layer 30 is larger than zero and is equal to or smaller than the diameter of the fiber CF of the reinforcing layer 40. The film thickness may be measured by performing image analysis and component analysis on at least a partial section of the high-pressure tank 100 (preferably, the cylindrical part 12) using an electron microscope to obtain an average value of the thicknesses of release agent components. In a state where the reinforcing layer 40 is peeled from the liner 10, the film thickness of the release agent layer 30 can be calculated by measuring the film thickness of the release agent layer 30 attached to the liner 10 side, and the film thickness of the release agent layer 30 attached to the reinforcing layer 40 side, respectively, and adding the film thicknesses together. In the present embodiment, although the film thickness of the release agent layer 30 is equal to or smaller than the diameter of the fiber CF of the reinforcing layer 40, it is more preferable that the film thickness of the release agent layer 30 is equal to or smaller than half of the diameter of the fiber CF of the reinforcing layer 40.

Figure 2:
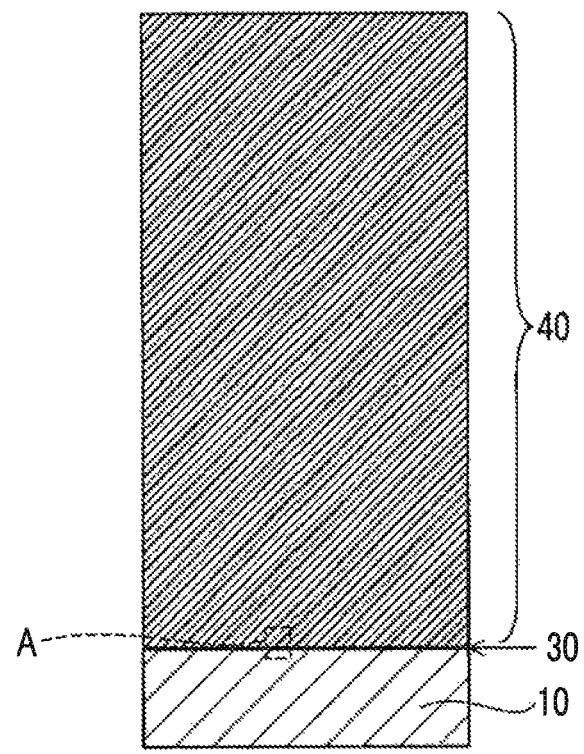
FIG. 2 is a sectional view taken along line II-II of FIG. 1.

FIG. 2 is a sectional view taken along line II-II of FIG. 1. As illustrated in FIG. 2, the release agent layer 30 is disposed on the surface of the liner 10. Additionally, the reinforcing layer 40 is disposed on the release agent layer 30. The thickness of the release agent layer 30 is, for example, 1 μm to 6 μm, and the thickness of the reinforcing layer 40 is, for example, 20 mm to 30 mm.

Figure 3:
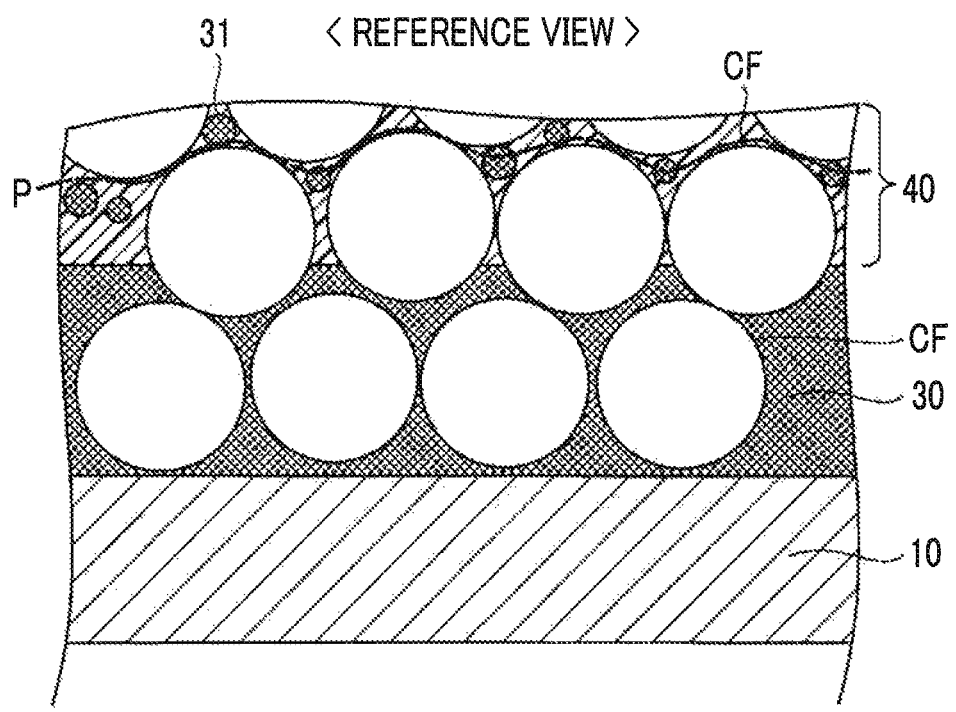
FIG. 3 is a reference view of portion A of FIG. 2.

FIG. 3 is a reference view of portion A of FIG. 2. As illustrated in FIG. 3, in a case where the film thickness of the release agent layer 30 is larger than the diameter of the fiber CF of the reinforcing layer 40, during the manufacture of the high-pressure tank 100, more specifically, during the thermal curing of the reinforcing layer 40, there is a case where fibers CF is buried in the release agent layer 30, and epoxy resin impregnated in the fibers CF and a release agent 31 of the release agent layer 30 may be compatibly mixed together. In this case, for example, during the use of the high-pressure tank 100, peeling may occur at a position P between the fibers CF inside the reinforcing layer 40, and the liner 10 and the reinforcing layer 40 may remain stuck together.

Figure 4:
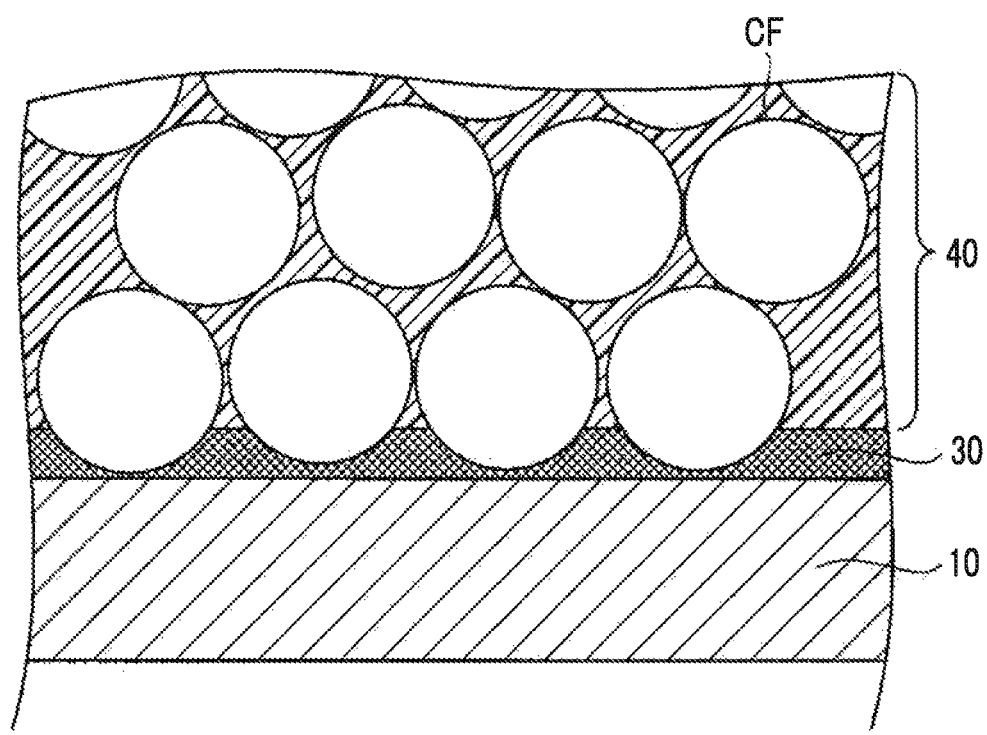
FIG. 4 is an enlarged view of portion A of FIG. 2.

FIG. 4 is an enlarged view of portion A of FIG. 2. As illustrated in FIG. 4, in the present embodiment, the film thickness of the release agent layer 30 is equal to or smaller than the diameter of the fiber CF of the reinforcing layer 40. For that reason, during the manufacture of the high-pressure tank 100, the fibers CF are not easily buried with the release agent layer 30. As a result, a situation in which the epoxy resin impregnated in the fibers CF and the release agent layer 30 are mixed together can be suppressed. For that reason, the sticking between the liner 10 and the reinforcing layer 40 is suppressed, and the liner 10 can be easily peeled from the reinforcing layer 40. Additionally, in a case where the film thickness of the release agent layer 30 is equal to or smaller than half of the diameter of the fiber CF of the reinforcing layer 40, a situation in which a center portion with the widest width of the fiber CF is buried in the release agent layer 30 may be suppressed. Therefore, the liner 10 can be more easily peeled from the reinforcing layer 40. That is, in the present embodiment, the smaller the film thickness of the release agent layer 30 is, the releasability of the liner 10 with respect to the reinforcing layer 40 can be made higher than usual.

In the high-pressure tank 100 according to the present embodiment described above, since the thickness of the release agent layer 30 is smaller than the diameter of the fiber CF of the reinforcing layer 40, a situation in which the epoxy resin of the reinforcing layer 40 and the release agent of the release agent layer 30 are mixed together can be suppressed. For that reason, the sticking between the liner 10 and the reinforcing layer 40 can be suppressed. As a result, a situation in which expansion and contraction of the liner 10 accompanying a temperature change or the like is hindered can be suppressed. Additionally, according to the present embodiment, the film thickness of the release agent layer 30 is relatively small. Thus, the application amount of the release agent of the release agent layer 30 can be reduced. For that reason, the manufacturing cost of the high-pressure tank 100 can be reduced.

An applicable embodiment of the present disclosure is not limited to the above-described embodiment and can be realized in various configurations within a scope not deviating from the gist of the present disclosure. For example, in the technical features in the embodiment corresponding to the technical features in the aspects described in the column "SUMMARY", in order to solve the above-described problems or in order to achieve some or all of the above-described effects, it is possible to appropriately perform substitutions and combinations. Additionally, unless the aforementioned technical features are described as being indispensable in the present specification, these technical features can be appropriately deleted.

What is claimed is:

1. A high-pressure tank comprising:
   a liner including a cylindrical part and two dome parts respectively provided at both ends of the cylindrical part;
   a release agent layer disposed on a surface of the liner; and
   a reinforcing layer disposed on the release agent layer, the reinforcing layer being configured to include a resin and a fiber,
   wherein a thickness of the release agent layer is equal to or smaller than a diameter of the fiber of the reinforcing layer,
   wherein the release agent layer comprises a release agent,
   wherein the release agent is polyethylene wax,
   wherein the release agent is disposed at least in an entire region between the cylindrical part of the liner and the reinforcing layer, and
   wherein:
   the thickness of the release agent layer is 1 μm to 6 μm; and
   a thickness of the reinforcing layer is 20 mm to 30 mm.

2. The high-pressure tank according to claim 1, wherein the fiber is a glass fiber or a carbon fiber.

3. The high-pressure tank according to claim 1, wherein the thickness of the release agent layer is equal to or smaller than half of the diameter of the fiber of the reinforcing layer.

4. The high-pressure tank according to claim 1, wherein the liner includes a cylindrical part and a dome part, and
   in an area between the reinforcing layer and the liner, the release agent layer is disposed solely in a region between the reinforcing layer and the cylindrical part of the liner.

5. A high-pressure tank comprising:
   a liner including a cylindrical part and two dome parts respectively provided at both ends of the cylindrical part;
   a release agent layer disposed on a surface of the liner; and a reinforcing layer disposed on the release agent layer, the reinforcing layer being configured to include a resin and a fiber, wherein a thickness of the release agent layer is equal to or smaller than half of a diameter of the fiber of the reinforcing layer, wherein the release agent layer comprises a release agent, wherein the release agent is disposed at least in an entire region between the cylindrical part of the liner and the reinforcing layer, and wherein:

the thickness of the release agent layer is 1 µm to 6 µm; and a thickness of the reinforcing layer is 20 mm to 30 mm.

* * * * *